Figure 1:
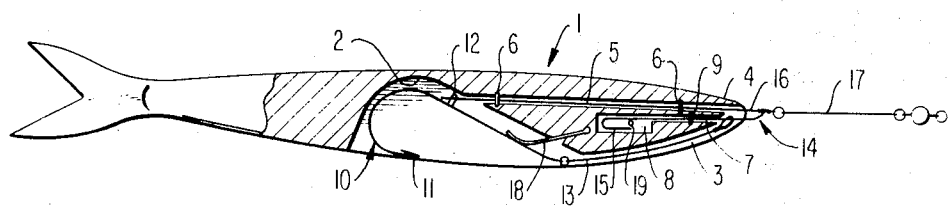

United States Patent [19]
Peippo

[11] 3,778,917
[45] Dec. 18, 1973

[54] DECOY, ESPECIALLY TROLLING HOOK
[76] Inventor: Emil Peippo, Harjavalta, Finland
[22] Filed: May 18, 1972
[21] Appl. No.: 254,378

[52] U.S. Cl. .................................................. 43/35
[51] Int. Cl. ............................................ A01k 85/02
[58] Field of Search ...................... 43/35, 37, 42.04

[56] References Cited
UNITED STATES PATENTS
3,081,572  3/1963  Tomsello .............................. 43/35
1,588,690  6/1926  Babbitt ................................ 43/35
3,685,192  8/1972  Stibbard ........................... 43/42.04

Primary Examiner—Antonio F. Guida
Assistant Examiner—Daniel J. Leach
Attorney—A. Donald Messenheimer

[57] ABSTRACT

A trolling decoy or lure comprising a body with a longitudinal recess open to one side of the body to receive a hook therein. The hook is held retracted in the recess by a setting pin releasably engaging a loop on the hook against the bias of a spring mounted on the body but is ejected outwardly from the recess by the spring when the setting pin is released from the hook loop upon the strike of a fish.

8 Claims, 2 Drawing Figures

DECOY, ESPECIALLY TROLLING HOOK

This invention relates to a fish decoy or lure having a body containing a longitudinal recess for at least one hook provided with a spring, which when in a retracted position is situated in the recess and is ejected outwardly when the fish strikes.

Trolling hooks of the above type are known where a recess or hollow extends through the body along the vertical axial plane. A double-branched elastic loop is provided on a transverse axis fixed to the front end of the recess with one or more fishing hooks attached at the end of both branches. These branches extend crosswise against a release piece member where the hooks enter into the body recess for the trolling position. In order to release the hooks to their fish catching position, an angle lever having two legs is hinged at its corner point to the upper part of the recess with one leg extending above the body and the other leg situated near the release piece member. On pressing that leg of the angle lever which extends upward from the body in downward direction, the angle lever turns and its other leg releases the hooks from the release piece member so as to fly out from the body. The condition for the hooks becoming released to the catching position is that when the fish strikes at the bait, the jaw of the fish will press down the extending leg of the angle lever. However, if the jaw of the fish does not hit just the mentioned extending leg, the hooks to not fly out and the fish will not get caught. Another disadvantage is that the hooks sometimes jump out needlessly no matter what presses against the protruding leg of the angle lever.

In order to get the fishing hooks into their position inside the trolling bait lure, one side of the body of the lure is normally made so that it can be opened. The lure body is thus made of two halves held together by a longitudinal hinge and provided with a locking means for holding the two halves in a closed position. A construction as described above, however, makes the trolling bait unsymmetrical with respect to its vertical axial plane, and increases at the same time the manufacturing costs of the bait.

The object of this invention is to eliminate the above-mentioned disadvantages by providing a novel decoy which can be manufactured from easily obtainable parts and with little difficulty.

The decoy according to the invention is dependable for catching fish, because releasing of the hook from the recess in the body occurs due to stretching of the line when the fish is striking at the bait. Furthermore, setting of the hook to its retracted position is very easy and fast to carry out.

Figure 2:
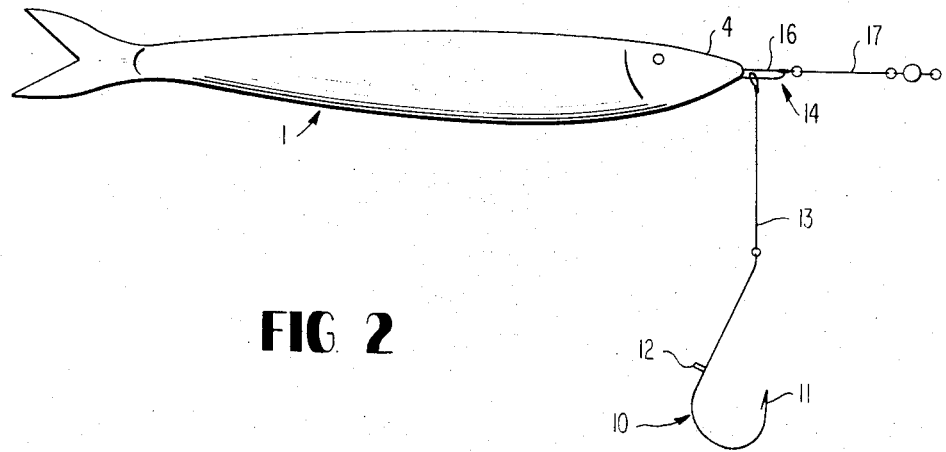

Other objects of the invention will become more fully apparent from the claims and from the following description when read in connection with the appended drawings wherein:

FIG. 1 is an elevation in partial section of the fish decoy according to the invention showing the hook in its retracted position; and FIG. 2 is a similar view of the bait lure of FIG. 1 showing the hook when it has been released.

The trolling bait or fish decoy of the present invention has a body 1 of a suitable material such as wood with a narrow, elongated recess 2 formed along its longitudinal vertical central plane. This recess 2 opens downward and continues as a shallow curved groove 3 which extends along the vertical central plane to the fore end of the body, i.e., that end where the head 4 of the decoy is located. In addition, a longitudinal base 5 extends from the head end 4 of the body 1 into the upper part of the recess 2, in which two annular guiding rings 6 fixed to the body are provided at spaced positions. However, these guiding rings 6 may be replaced by staples or the like. A channel 7 is formed in the body 1 extending from its head end 4, which is situated below the bore 5 and ends up in the chamber 8 between the fore end of the body and the recess 2. A guiding ring 9, staple or the like, is also fixed in channel 7. A stop pin 19 extends across chamber 8. In order to catch the fish the trolling bait is furnished with a hook 10, while a loop 12 is fixed to the stem of the hook on the opposite side from its barb 11 for a purpose to be described below. The eye of the hook 10 is connected preferably to the end of a spring wire 13. The other end of spring wire 13, as illustrated in the drawings, is slidably attached to the latch member which may comprise rod 14. Rod 14 extends through the guiding ring 9 in the channel 7, and its rear end, i.e., the end or tail facing the rear end of the bait is formed with a forwardly directed hook 15 situated in the chamber 8. The front end of the rod 14 is fixedly attached to the setting pin 16. Setting pin 16 runs through the guiding rings 6 in the bore 5 with its rear end extending into the recess 2 to engage loop 12 on hook 10 and its front end remaining outside of the head end 4 of the body. For trolling the bait, a fish line 17 is connected to the forward end of the setting pin 16. The latch member rod 14, its hook 15, and the stop pin 19 form the holding device for keeping the decoy attached to the fish line 17. In addition, one end of a plate spring 18 is fixed inside of the body 1 with its free end bent upward and reaching into the lower part of the recess 2.

In order to bring the above described trolling hook according to the invention into condition for casting, the spring wire 13 is placed in the groove 3 and the hook 10 is pressed into the recess 2 against the force of the plate spring 18. With the hook in this position the setting pin 16 is pushed rearward so that its rear end guided by the guiding rings 6 enters into the loop 12 fixed to the hook. Then, as illustrated in FIG. 1 the hook 10 stays in the recess 2 under tension of the plate spring 18 and the spring wire 13 (provided the latter is a spring wire), while the end of the setting pin 16 bends against the loop 12 to such position, that the barb 11 does not reach outside of the body 1. When the setting pin 16 is pushed rearward, the latch member rod 14 also moves rearward, and the bottom of its hook 15 moves rearward from the stop pin 19 as illustrated in FIG. 1.

When trolling with the bait according to the invention in the usual manner, or when reeling it back after the cast and the fish is striking at the bait, the line fish 17 is tensioned sufficiently to pull the setting pin 16 forward, so that the end of setting pin 16 leaves the loop 12 of the hook 10. Due to the plate spring 18, and spring wire 13, the hook 10 is then ejected out from the recess 2 and exposed to the fish. At the same time as the setting pin 16 is pulling forward from the loop 12, the latch member rod 14 is moving forward until the bend of its hook 15 will rest against the stop pin 19 in the chamber 8, to hold the trolling bait attached to the fish line 17.

The decoy according to the invention is suited for trolling and swivelling also in reeds, and in other such waters with possible twigs etc., because the fishing hook is hidden inside of the body until the fish is biting at the bait. However, nothing prevents using a trolling bait like this also as bait in bobbing.

The invention is not limited only to the embodiment described above, but can be varied considerably as to details within the scope of the invention. This is particularly true in regard to the construction of the holding device holding the decoy attached to the fish line.

I claim:

1. An improved fish decoy having a body with an elongated recess open to one side of the body and a longitudinal bore extending from the front part of the body into the recess, a setting pin attached to a fish line and extending through the bore for slidable movement therein so that the rear end of the setting pin may protrude into the recess, a fish hook adapted to be positioned within said elongated recess and having a shank portion provided with a loop adapted to fit over the rear end of the setting pin when protruding into the recess, a spring member having one end fixed to the decoy body and the other end urged against the hook and adapted to eject the hook out of the body when the setting pin is released from the hook loop, means for preventing the setting pin from sliding forwardly out of the bore when the setting pin has released the loop, and a spring wire attached with one end of the hook and with the other end located at the forward end of the decoy body so that the spring wire is flexed to be biased along the decoy body surface when the hook is held in its retracted position but is free from the bias force when the hook is released.

2. The improved decoy of claim 1, in which the side of the body having the open recess is formed with a longitudinal groove extending from the recess to the front part of the body, and wherein the spring wire is located in said longitudinal groove when the hook is held in its retracted position.

3. The improved decoy of claim 2, in which the means for preventing the setting pin from sliding out of the body comprises a pin secured to said body and a latch member fixedly attached to the setting pin and adapted to engage said pin when the rear end of the setting pin slides into the bore releasing the hook.

4. The improved decoy of claim 3, wherein the body includes a second longitudinal bore extending from the front part of the body to an enlarged chamber within said body, wherein said body pin extends transversely across said chamber, and wherein said latch member comprises a rod having one end fixed to the front end of the setting pin and the other end having a hook portion, said hook portion being located in said chamber and adapted to engage the body pin when the hook is released.

5. The improved decoy of claim 4 wherein the other end of the spring wire is slidably attached to the latch member rod.

6. The improved decoy of claim 1, in which the means for preventing the setting pin from sliding out of the body comprises a pin secured to said body and a latch member fixedly attached to the setting pin and adapted to engage said pin when the rear end of the setting pin slides into the bore releasing the hook.

7. The improved decoy of claim 6, wherein the body includes a second longitudinal bore extending from the front part of the body to an enlarged chamber within said body, wherein said body pin extends transversely across said chamber, and wherein said latch member comprises a rod having one end fixed to the front end of the setting pin and the other end having a hook portion, said hook portion being located in said chamber and adapted to engage the body pin when the hook is released.

8. The improved decoy of claim 7 wherein the other end of the spring wire is slidably attached to the latch member rod.

* * * * *

UNITED STATES PATENT OFFICE
CERTIFICATE OF CORRECTION

Patent No. 3,778,917                  Dated December 18, 1973

Inventor(s)  EMIL PEIPPO

It is certified that error appears in the above-identified patent and that said Letters Patent are hereby corrected as shown below:

After:

"[21] Appl. No. 254,378"

Insert:

--[30] Priority   May 21, 1971
                  Finland
                  1410/71--

Signed and sealed this 16th day of April 1974.

(SEAL)
Attest:

EDWARD M. FLETCHER, JR.                C. MARSHALL DANN
Attesting Officer                      Commissioner of Patents